United States Patent
Hall et al.

(10) Patent No.: US 9,834,983 B1
(45) Date of Patent: Dec. 5, 2017

(54) INTELLIGENT WINDOW BLIND ADJUSTMENT

(71) Applicants: David R. Hall, Provo, UT (US); Joe Fox, Spanish Fork, UT (US); Jedediah Knight, Provo, UT (US); Austin Carlson, Provo, UT (US); Kevin Rees, Herriman, UT (US); Emily Brimhall, Alpine, UT (US); Jerome Miles, Spanish Fork, UT (US)

(72) Inventors: David R. Hall, Provo, UT (US); Joe Fox, Spanish Fork, UT (US); Jedediah Knight, Provo, UT (US); Austin Carlson, Provo, UT (US); Kevin Rees, Herriman, UT (US); Emily Brimhall, Alpine, UT (US); Jerome Miles, Spanish Fork, UT (US)

( * ) Notice: Subject to any disclaimer, the term of this patent is extended or adjusted under 35 U.S.C. 154(b) by 0 days.

(21) Appl. No.: 15/175,359

(22) Filed: Jun. 7, 2016

(51) Int. Cl.
    *E06B 9/307* (2006.01)
    *E06B 9/32* (2006.01)
    *E06B 9/28* (2006.01)
    *E06B 9/68* (2006.01)

(52) U.S. Cl.
    CPC ........... *E06B 9/307* (2013.01); *E06B 9/32* (2013.01); *E06B 2009/285* (2013.01); *E06B 2009/6818* (2013.01); *G05B 2219/2614* (2013.01); *G05B 2219/2653* (2013.01)

(58) Field of Classification Search
    CPC .... E06B 9/307; E06B 9/32; E06B 2009/6818; E06B 2009/285; G05B 2219/2614; G05B 2219/2653
    See application file for complete search history.

(56) References Cited

U.S. PATENT DOCUMENTS

| 9,540,871 | B2 * | 1/2017 | Hall | F16H 1/20 |
| 2008/0053628 | A1 * | 3/2008 | Anderson | E06B 9/264 160/238 |
| 2012/0261078 | A1 * | 10/2012 | Adams | E06B 9/32 160/6 |
| 2012/0261079 | A1 * | 10/2012 | Chambers | E06B 9/32 160/6 |
| 2014/0338844 | A1 * | 11/2014 | Diederiks | E06B 9/68 160/5 |

(Continued)

*Primary Examiner* — Blair M Johnson

(57) ABSTRACT

An apparatus for automating a set of window blinds is described. The apparatus includes a motor and a microcontroller. The motor includes a window blind coupler that couples a window blind tilt rod to the motor. The microcontroller stores instructions that, when executed, instruct the microcontroller to dynamically actuate the window blind coupler via the motor. The instructions include obtaining a desired room temperature, calculating a first temperature gradient between the window-side of the window blinds and the room-side of the window blinds based on a window-side temperature and a room-side temperature, and calculating a second temperature gradient between the room-side temperature and the desired temperature. The instructions further include retrieving a tilted state related to the first temperature gradient, the desired room temperature, and a zero-value second temperature gradient, and activating the motor to turn the window blind coupler to tilt the window blinds to the tilted state.

20 Claims, 14 Drawing Sheets

(56) References Cited

U.S. PATENT DOCUMENTS

2015/0160626 A1* 6/2015 Cregg .................... G05B 15/02
    700/275
2015/0284990 A1* 10/2015 Hall ......................... F16H 1/20
    74/606 R

* cited by examiner

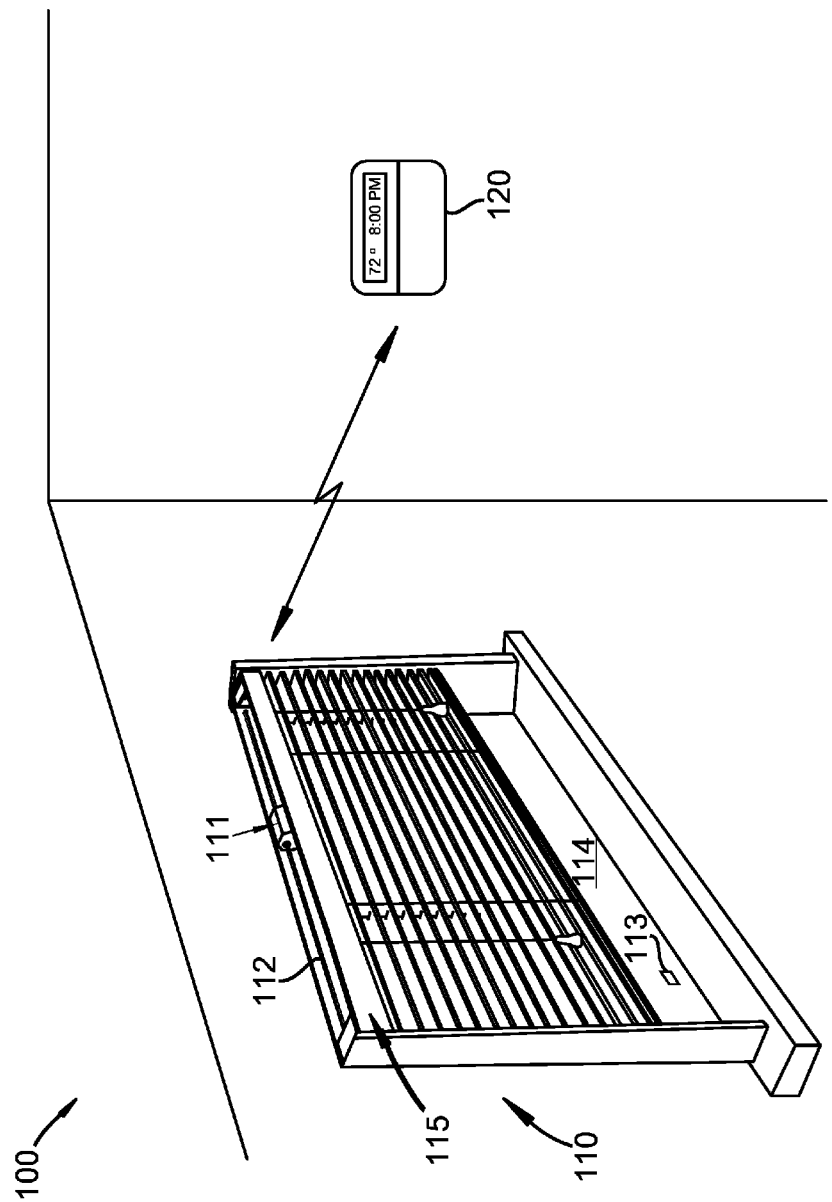

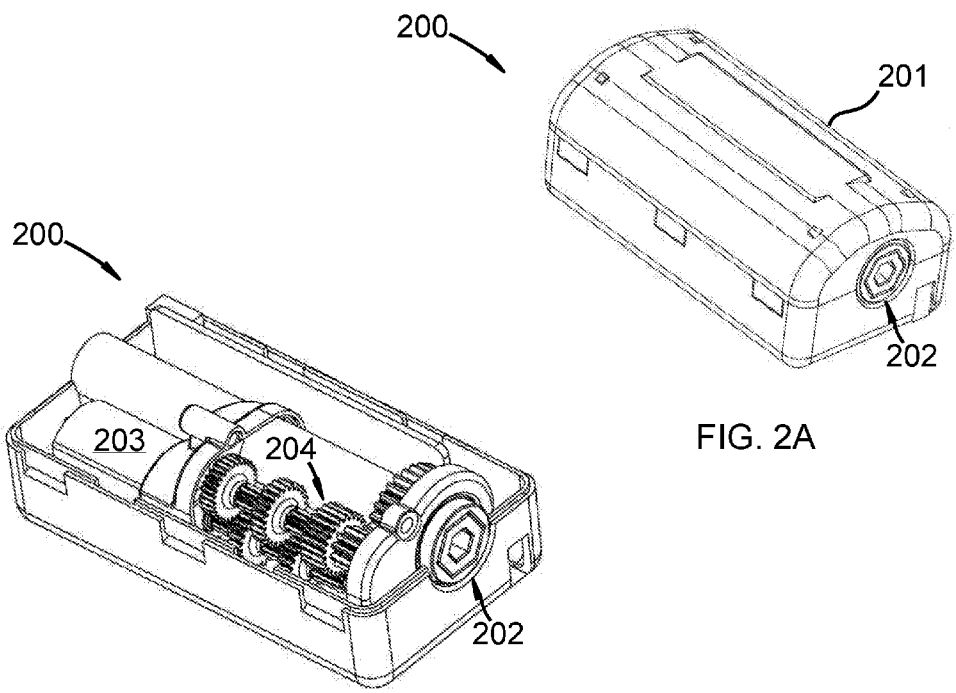
FIG. 2A
FIG. 2B
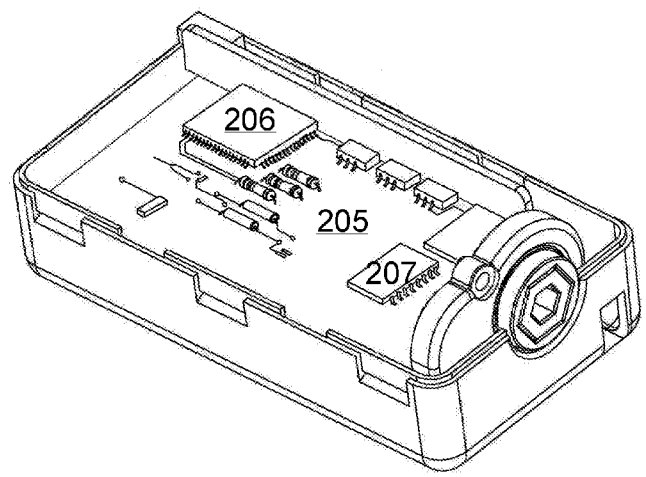
FIG. 2C

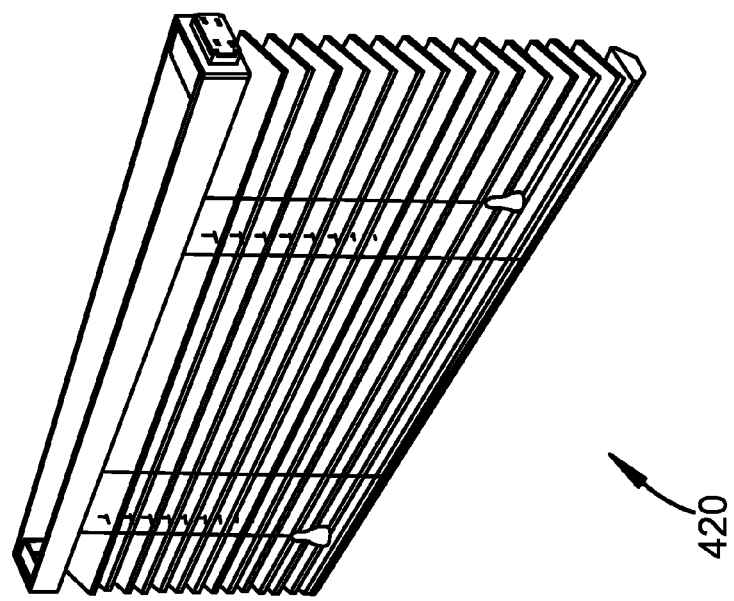
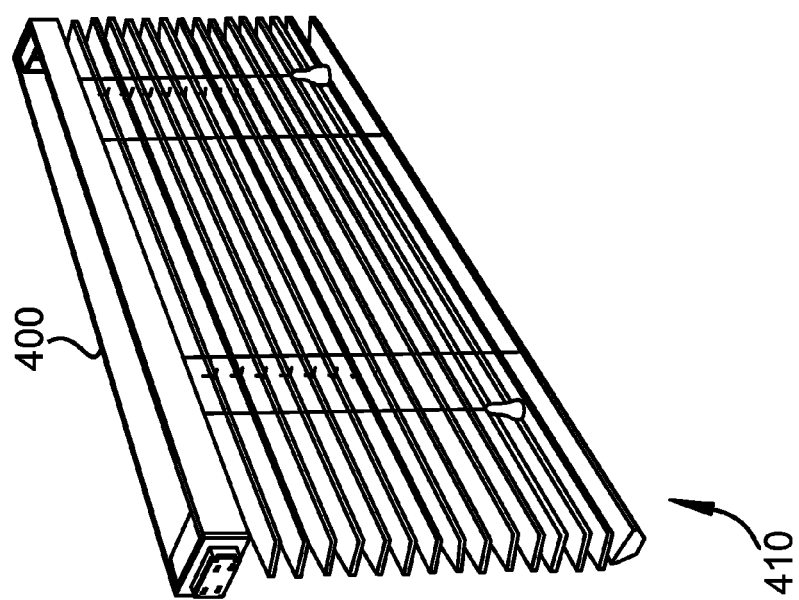
FIG. 4

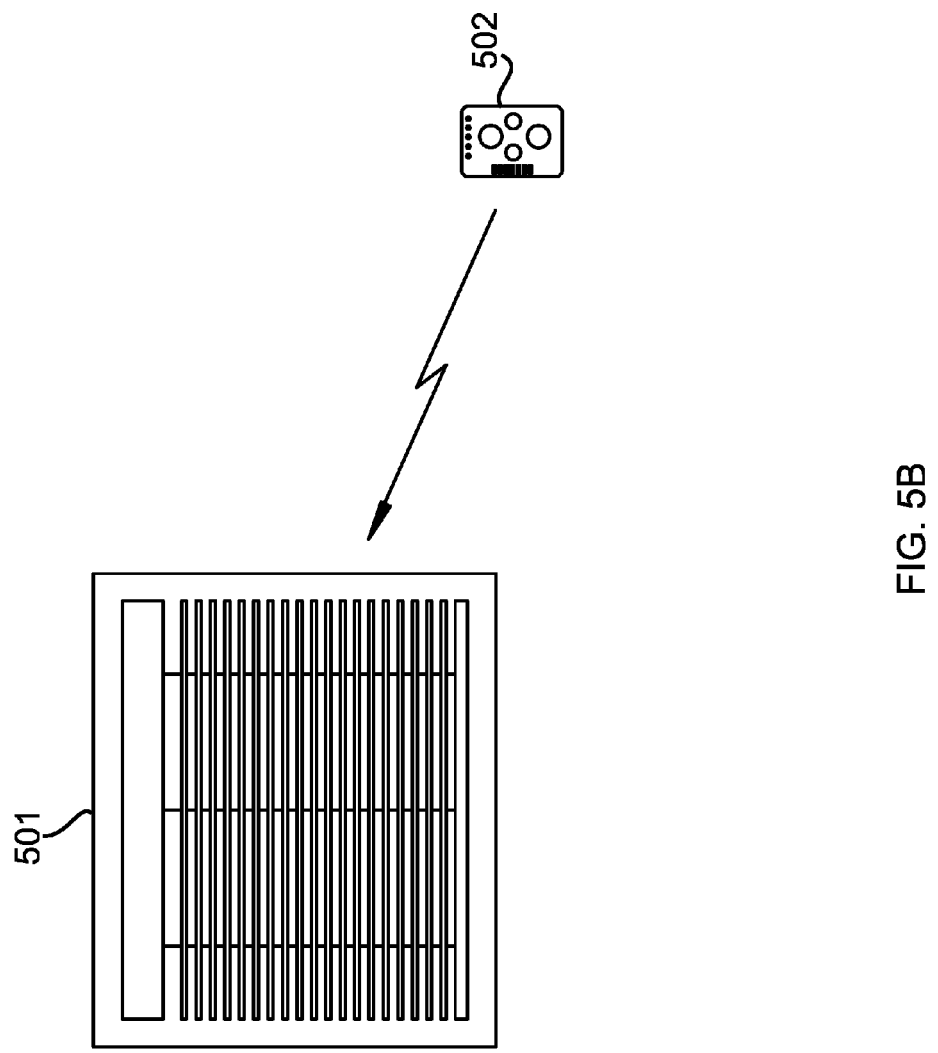

US 9,834,983 B1

INTELLIGENT WINDOW BLIND ADJUSTMENT

TECHNICAL FIELD

This invention relates generally to the field of home automation, and more specifically to automated window blinds.

BACKGROUND

Home and office automation is an exploding market with dozens of manufacturers offering hundreds of products. Products and solutions range from customizable room lighting to smart door locks, and even adaptive thermostats. Smart blinds are also an emerging area of automation. Despite this, smart blinds still require a high degree of user interaction, such as requiring a user to program specifically what time of day the blinds should adjust. Some manufacturers have included temperature as a feature users can manipulate, but the high degree of required user interaction with the blinds automation system leaves much still to be desired.

SUMMARY OF THE INVENTION

An automated window blind system is disclosed that overcomes or improves upon the limitations discussed above. In general, the automated window blind system includes a set of window blinds and two temperature sensors, one positioned at a window-side of the blinds, the other positioned at a room-side of the blinds. The system also includes hardware memory that stores dynamic tilt instructions that, when executed by the one or more hardware processors, dynamically tilt the window blinds. This improves a user's experience using automated blinds. The automated blinds dynamically adjust based on temperature gradients to maintain a desired room temperature while maximizing the amount of natural light in the room. All this is done without the need for constant user input.

An automated window blind system is described herein. The system includes a set of window blinds, a motor that tilts the window blinds, a first temperature sensor, a second temperature sensor, a thermostat, one or more hardware processors, and hardware memory. The first temperature sensor is positioned at a window-side of the window blinds, and the second temperature sensor is positioned at a room-side of the window blinds. The hardware memory stores dynamic tilt instructions that, when executed by the one or more hardware processors, dynamically tilt the window blinds. The instructions include obtaining a desired room temperature from the thermostat, calculating a first temperature gradient between the window-side of the window blinds and the room-side of the window blinds based on a window-side temperature and a room-side temperature, and calculating a second temperature gradient between the room-side temperature and the desired temperature. The instructions further include retrieving a tilted state related to the first temperature gradient, the desired room temperature, and a zero-value second temperature gradient, and tilting the window blinds to the tilted state.

A method for automating a window blind system is also described. The method includes obtaining a desired room temperature from a thermostat, calculating a first temperature gradient between a window-side of a set of window blinds and a room-side of the window blinds based on a window-side temperature and a room-side temperature, and calculating a second temperature gradient between the room-side temperature and the desired temperature. The method further includes retrieving a tilted state related to the first temperature gradient, the desired room temperature, and a zero-value second temperature gradient, and tilting the window blinds to the tilted state.

An apparatus for automating a set of window blinds is also described. The apparatus includes a motor and a microcontroller. The motor includes a window blind coupler that couples a window blind tilt rod to the motor. The microcontroller stores instructions that, when executed, instruct the microcontroller to dynamically actuate the window blind coupler via the motor. The instructions include obtaining a desired room temperature, calculating a first temperature gradient between the window-side of the window blinds and the room-side of the window blinds based on a window-side temperature and a room-side temperature, and calculating a second temperature gradient between the room-side temperature and the desired temperature. The instructions further include retrieving a tilted state related to the first temperature gradient, the desired room temperature, and a zero-value second temperature gradient, and activating the motor to turn the window blind coupler to tilt the window blinds to the tilted state.

BRIEF DESCRIPTION OF THE DRAWINGS

A more particular description of the invention briefly described above is made below by reference to specific embodiments. Several embodiments are depicted in drawings included with this application, in which:

FIG. 1 depicts a general embodiment of an automated window blind system;

FIG. 2A-C depict isometric views of a motor for use with an automated blind system;

FIG. 4 depicts a set of window blinds adjusting tilt based on a temperature gradient;

FIGS. 5A-C depict several example embodiments of control systems for a set of intelligent window blinds;

DETAILED DESCRIPTION

Figures 3A, 3B:
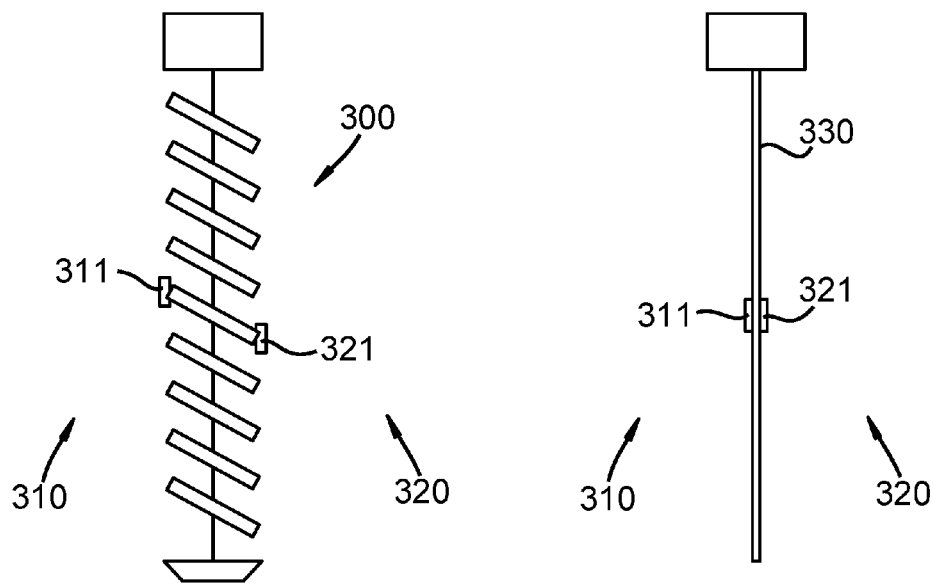
FIG. 3A-C depict embodiments of placements of temperature sensors on a set of window blinds.

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

In some instances, features represented by numerical values, such as dimensions, mass, quantities, and other properties that can be represented numerically, are stated as approximations. Unless otherwise stated, an approximate value means "correct to within 50% of the stated value." Thus, a length of approximately 1 inch should be read "1 inch +/−0.5 inch."

All or part of the present invention may be embodied as a system, method, and/or computer program product. The computer program product may include a computer readable storage medium (or media) having computer readable program instructions thereon for causing a processor to carry out aspects of the present invention. For example, the computer program product may include firmware programmed on a microcontroller.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a chemical memory storage device, a quantum state storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming languages such as Smalltalk, C++ or the like, and conventional procedural programming languages such as the "C" programming language or similar programming languages. Computer program code for implementing the invention may also be written in a low-level programming language such as assembly language.

In some embodiments, electronic circuitry including, for example, programmable logic circuitry, field-programmable gate arrays (FPGA), or programmable logic arras (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. Those of skill in the art will understand that each block of the flowchart illustrations and/or block diagrams, and combinations of blocks in the flowchart illustrations and/or block diagrams, may be implemented by computer readable program instructions. Additionally, those of skill in the art will recognize that the system blocks and method flowcharts, though depicted in a certain order, may be organized in a different order and/or configuration without departing from the substance of the claimed invention.

These computer readable program instructions may be provided to a processor of a general purpose computer, special purpose computer, embedded system, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 depicts a general embodiment of an automated window blind system. System 100 includes window blinds 110, motor 111, tilt rod 112, temperature sensor 113, window 114, headrail 115, and thermostat 120. Tilt rod 112 is coupled to window blinds 110 and motor 111, and motor 111 tilts window blinds 110 by rotating tilt rod 112. Temperature sensor 113 is positioned at a window-side of window blinds 110. For example, in the depicted embodiment, temperature sensor 113 is positioned at an inside surface of window 114. However, in other embodiments, temperature sensor 113 is positioned, for example, at an outside surface of window 114. In some embodiments, temperature sensor 113 is positioned at the window-side of headrail 115. In yet other embodiments (depicted in more detail below), temperature sensor 113 is positioned on a blind of window blinds 110 at the window side.

Thermostat 120 is positioned at a room-side of window blinds 110. In some embodiments, thermostat 120 includes a second temperature sensor (not shown). However, in other embodiments, the second temperature sensor is positioned elsewhere in the room. For example, in one embodiment, the second temperature sensor is positioned at the room-side of headrail 115. In another embodiment, the second temperature sensor is positioned on a blind of window blinds 110 at the room side.

Though not shown, system 100 includes one or more hardware processors and hardware memory. For example, in one embodiment (depicted in more detail below), motor 111 includes a microcontroller having processors and memory. In another embodiment, motor 111 additionally includes a transceiver that communicates with a remote control hub or server, a thermostat, and/or a remote switch for system 100. For example, in one embodiment, the motor is controlled by a local wireless control hub that stores control instructions for system 100 in hardware memory and executes the control instructions via hardware processors. In some embodiments, the control hub is networked to one or more cloud servers (also depicted in more detail below) that store control instructions for system 100 in hardware memory and execute the control instructions via hardware processors. In such embodiments, a user can remotely control system 100 via the servers. For example, in one embodiment, a user transmits instructions to the servers to open the window blinds via a user device, such as a mobile phone, a tablet, or a personal computer. The server parses the instructions and forwards control instructions to the control hub, which in turn forwards the control instructions to motor 111. Motor 111 actuates in response to the control instructions and opens the window blinds.

In some embodiments, thermostat 120 communicates a desired room temperature to the hardware processors via a thermostat wireless transceiver. In other embodiments, a user device, such as a personal computer, a laptop compuer, a smartphone, or a tablet, communicates a desired room temperature to the hardware processors. As is explained in more detail below, the desired room temperature is used to calculate, in part, an optimal tilt state of blinds 110.

The embodiments described above provide several benefits. For example, using system 100, a user can control window blinds 110 from anywhere without having to be in the same room as window blinds 110 by communicating with window blinds 110 over the Internet. However, if the Internet goes down, a user can still control window blinds 110 via the local control hub because the local control hub is networked to the window blinds via a stand-alone local network. In some of the embodiments, a user can control window blinds 110 directly by communicating directly with the microcontroller via, for example, a remote. Thus, even if the local network is down, the user can control window blinds 110.

In many cases, it is beneficial for system 100 to be entirely automated. The hardware memory described above with regard to the microcontroller, the control hub, or the server, stores dynamic tilt instructions that, when executed by the processors, instruct the motor to dynamically tilt window blinds 110. The instructions include obtaining a desired room temperature, for example, from thermostat 120. In one embodiment, a user inputs a desired temperature at thermostat 120. In another embodiment, the microcontroller is pre-programmed with the desired room temperature. The instructions also include calculating a first temperature gradient between the window-side of window blinds 110 and the room-side of window blinds 110 based on a window-side temperature and a room-side temperature. The window-side temperature is determined by temperature sensor 113, and the room-side temperature is determined by the second temperature sensor (such as thermostat 120, as described above). The instructions further include calculating a second temperature gradient between the room-side temperature and the desired room temperature.

In an ideal case, the desired room temperature is the same as the actual room temperature, and thus the second temperature gradient is zero. The zero-value second temperature gradient is associated with the first temperature gradient, the desired room temperature, and a tilted state of window blinds 110. This relationship can be approximated as a linear relationship, expressed analytically as:

$$a\nabla T_1 + bT_{set} + c\,\%_{open} = d\nabla T_2,$$

where $\nabla T_1$ is the first temperature gradient, $T_{set}$ is the desired temperature, $\%_{open}$ is the tilted state, and $\nabla T_2$ is the second temperature gradient. a, b, c, and d are coefficients that represent the magnitude of impact each variable has on the overall algorithm. Because the optimal value of $\nabla T_2$ is zero, the nominal value of d is 1 to simplify the determination of a, b and c.

a, b and c are determined by minimizing a cost function associated with each constant as compared to a training set. The training set is a set of measured values for each variable. For example, in one case, $T_{set}$ is 69° F., $\%_{open}$ is 100%, and $\nabla T_1$ is 0° F. These values correspond with a zero-value $\nabla T_2$. In another case, $T_{set}$ is 69° F., $\%_{open}$ is 100%, and $\nabla T_1$ is 4° F. These values correspond with a $\nabla T_2$ of, for example, 2° F. However, if window blinds 110 are set to 50% open, $\nabla T_2$ becomes 0° F. a, b and c represent how much a change in one variable affects a change in the other variables (such as a 50% change in tilt status corresponds with a 2-degree change in the second temperature gradient at 69° F.).

The hardware memory stores the training set and the calculated values for a, b, c and d. In dynamically tilting window blinds 110, the instructions include retrieving a tilted state related to the first temperature gradient, the desired room temperature, and a zero-value second temperature gradient, and tilting window blinds 110 to the tilted state. In some embodiments, the hardware memory further includes instructions for updating the training set and the values for a, b, c and d based on actual use data. The instructions include waiting for a second temperature gradient adjustment period, re-calculating the second temperature gradient, and updating the relationship between the tilted state, the first temeperature gradient, the desired room temperature, and the second temperature gradient with the re-calculated second temperature gradient. Additionally, in some ebmodiments, the dynamic tilt instructions further include re-calculating the first temperature gradient, retrieving a new tilted state related to the re-calculated first temperature gradient, the desired room temperature, and the zero-value second temperature gradient, and tilting the window blinds to the new tilted state.

For example, the training data may indicate that a zero-value second temperature gradient is associated with a 50% tilted state when the desired temperature is 69° F. and the first temperature gradient is 3° F., but when put into practice, the 50% tilted state corresponds with a 1° F. second temperature gradient. The processors update the memory with this information and adjust window blinds 110 accordingly, closing them further until a zero-value second temperature gradient is reached. The processors update the memory, including the values of a, b, c and d accordingly.

FIGS. 2A-C depict isometric views of a motor for use with an automated blind system. FIG. 2A depicts motor assembly 200, including housing 201 and window blind coupler 202. Coupler 202 couples a window blind tilt rod (not shown, but similar to tilt rod 112 described above) to motor assembly 200. FIG. 2B depicts motor assembly 200 without housing 201, revealing motor 203 and gears 204. Motor 203 rotates gears 204, which in turn rotate coupler 202.

FIG. 2C depicts motor assembly 200 without housing 201, motor 203, or gears 204. Motor assembly 200 additionally includes printed circuit board (PCB) 205, microcontroller 206, and transceiver 207. In some embodiments, transceiver 207 is a wired transceiver, such as for an Ethernet network connection. In other embodiments, transceiver 207 is a wireless transceiver. Microcontroller 206 is networked to transceiver 207 via PCB 206. Additionally, microcontroller 206 stores instruction that, when executed, instruct motor 203 to dynamically actuate coupler 202. The instruction include obtaining a desired room temperature, a first temperature at a window-side of a set of window blinds, and a second temperature at a room-side of the window blinds. For example, in one embodiment microcontroller 206 obtains, via transceiver 207, the desired temperature and the first and second temperatures from a thermostat and first and second temperature sensors, respectively, such as is described above with regard to FIG. 1. The instructions stored on microcontroller 206 further include calculating a first temperature gradient between the first temperature and the second temperature, and calculating a second temperature gradient between the second temperature and the desired room temperature. The instructions also include retrieving a tilted state related to the first temperature gradient, the desired room temperature, and a zero-value second temperature gradient, similar to the zero-value second temperature gradient described above with regard to FIG. 1. The instructions additionally include activating motor 203 to turn coupler 202 to tilt the window blinds to the tilted state. In some embodiments, the instructions further comprise notifying a user of the tilt state via transceiver 207. For example, in one embodiment, transceiver 207 transmits a wireless signal that is received by a user device, such as a mobile phone, notifying the user that the tilted state was adjusted based on the zero-value second temperature gradient algorithm.

Figure 3C:
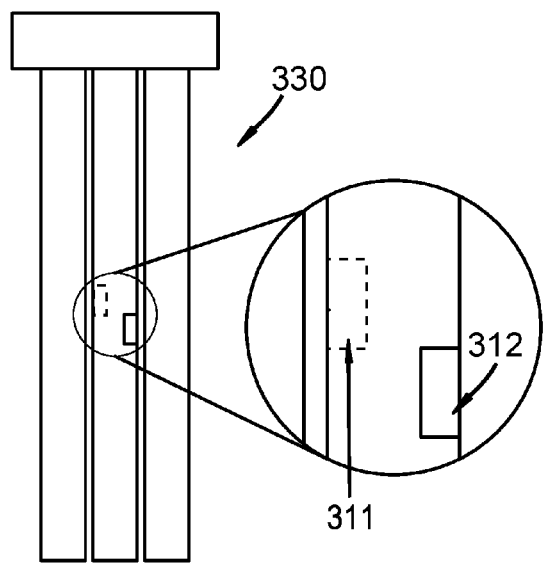

FIGS. 3A-C depict embodiments of placements of temperature sensors on a set of window blinds. FIG. 3A depicts a set pf horizontal window blinds and FIGS. 3B-C depict a set of verticle window blinds. FIG. 3A depicts a side view of horizontal window blinds 300, including temperature sensors 311, 321. Temperature sensor 311 is positioned on a window blind slat on window-side 310 of window blinds 300. Temperature sensor 321 is positioned on the same window blind slat on room-side 320 of window blinds 300. However, in other embodiments, temperature sensors 311, 321 are positioned on different slats. For example, in one embodiment, temperature sensor 311 is positioned on a lower slat because upper slats are shaded by an exterior awning. In the same or other embodiments, temperature sensor 321 is positioned on an upper slat because an air vent is positioned beneath window blinds 300. Temperature sensor 311 measures an air temperature on window-side 310 of window blinds 300 and temperature sensor 321 measures an air temperature on room-side 320 of window blinds 300. Temperature sensors 311, 321 are any of a variety of off-the-shelf temperature sensors. For example, in one embodiment, temperature sensors 311, 321 are thermocouples. In another embodiment, temperature sensors 311, 321 are thermistors. In another embodiment, temperature sensors 311, 321 are RTD's. In some embodiments, temperature sensor 311 is selected based on a resistance to extreme light and temperature conditions, and temperature sensor 321 is selected based on a thermal sensitivity.

Temperature sensors 311, 321 communicate with a window blind motor microcontroller (such as those described above with regard to FIG. 2) via any of a variety of wired and/or wireless connections. In one embodiment, temperature sensors 311, 321 transmit temperatures to the microcontroller wirelessly, such as via Bluetooth, WiFi, ZWave, Zigbee, and/or SureFi (SureFi is a low data-rate, low-power, wireless protocal for the 902-928 MHz band). In another embodiment, temperature sensors 311, 321 are hardwired directly to the microcontroller. Additionally, temperature sensors 311, 321 are powered in a variety of ways. For example, in one embodiment, temperature sensors 311, 321 draw power from a motor (such as motor 203 described with regard to FIG. 2). In another embodiment, temperature sensors 311, 321 are battery-powered.

FIG. 3B depicts a side view of vertical window blinds 330 and temperature sensors 311, 321. Temperature sensor 311 is positioned on a vertical window blind slat at window-side 310 of window blinds 330. Temperature sensor 321 is positioned on the same slat at room-side 320 of window blinds 330. However, in other embodiments, temperature sensors 311, 321 are positioned on different slats, such as is described above with regard to FIG. 3A. In any embodiment, temperature sensors 311, 321 are positioned to accurately measure the window-side and room-side temperatures. In the depicted embodiment, temperature sensors 311, 321 are positioned halfway between the top and the bottom of a slat of window blinds 330 on the same horizontal plane. In another embodiment, temperature sensor 311 is positioned higher than temperature sensor 321. In yet another embodiment, temperature sensor 321 is positioned higher than temperature sensor 311. FIG. 3C depicts a front view of window blinds 330 and temperature sensors 311, 312 positioned at the window-side and room-side of window blinds 330, respectively.

FIG. 4 depicts a set of window blinds adjusting tilt based on a temperature gradient. As depicted, window blinds 400 adjust from fully open 410 to partially open 420. Window blinds 400 tilt based on intelligent sensing of surrounding temperature conditions, such as a window-side temperature, a room-side temperature, and a desired temperature. The intelligent sensing includes calculating a temperature gradient between the window-side and room-side of window blinds 400, and calculating a second temperature gradient between the room-side of window blinds 400 and the desired temperature. Intelligent memory stores data that relates the temperature gradients and the desired temperature to the amount window blinds 400 are open (such as is described with regard to FIG. 1). When a temperature gradient is detected between the room-side temperature and the desired temperature, window blinds 100 tilt to a tilted state corresponding with a zero-value room-side/desired temperature gradient, a current desired temperature, and a window-side/room-side temperature gradient.

Figure 5A:
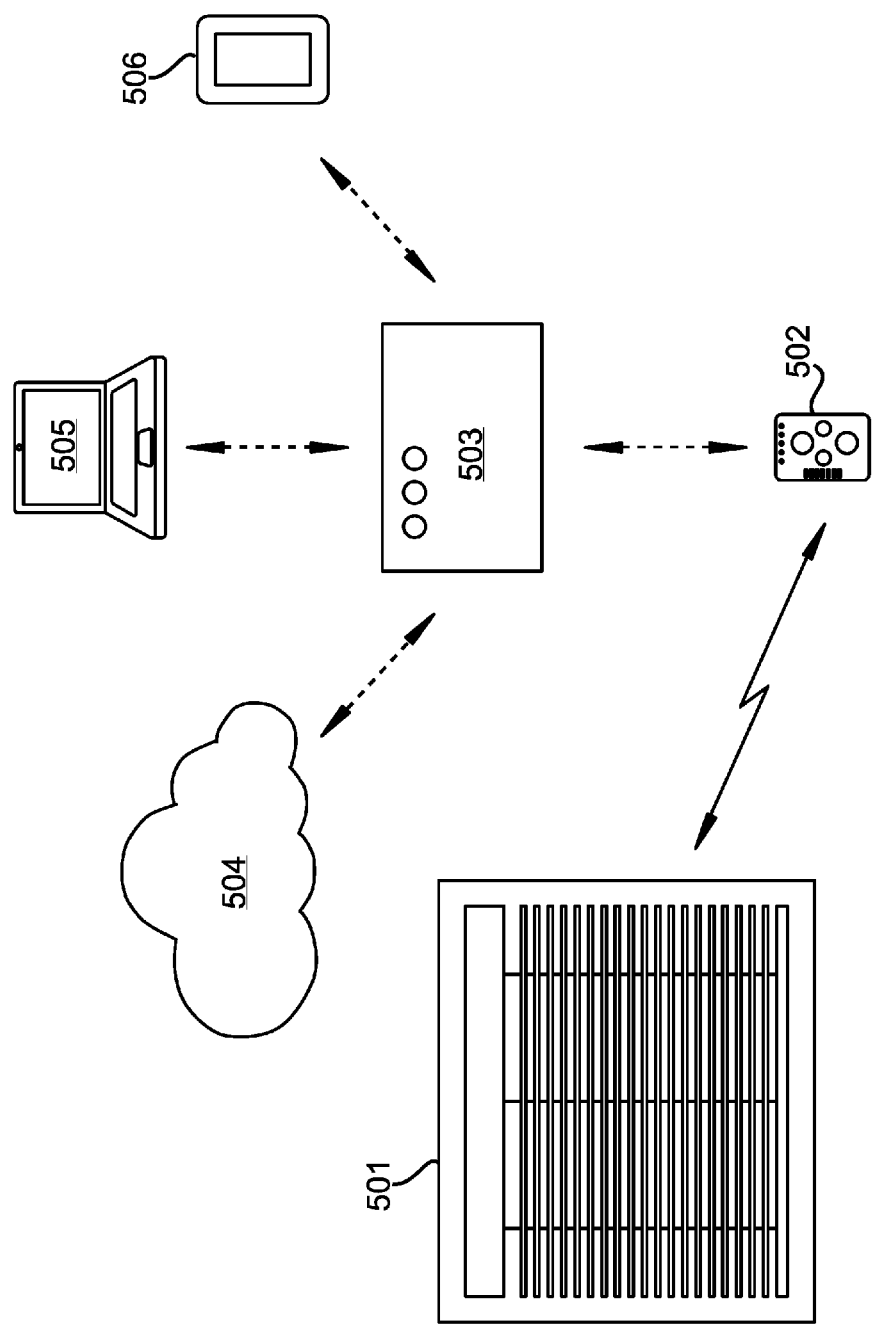
Figure 5C:
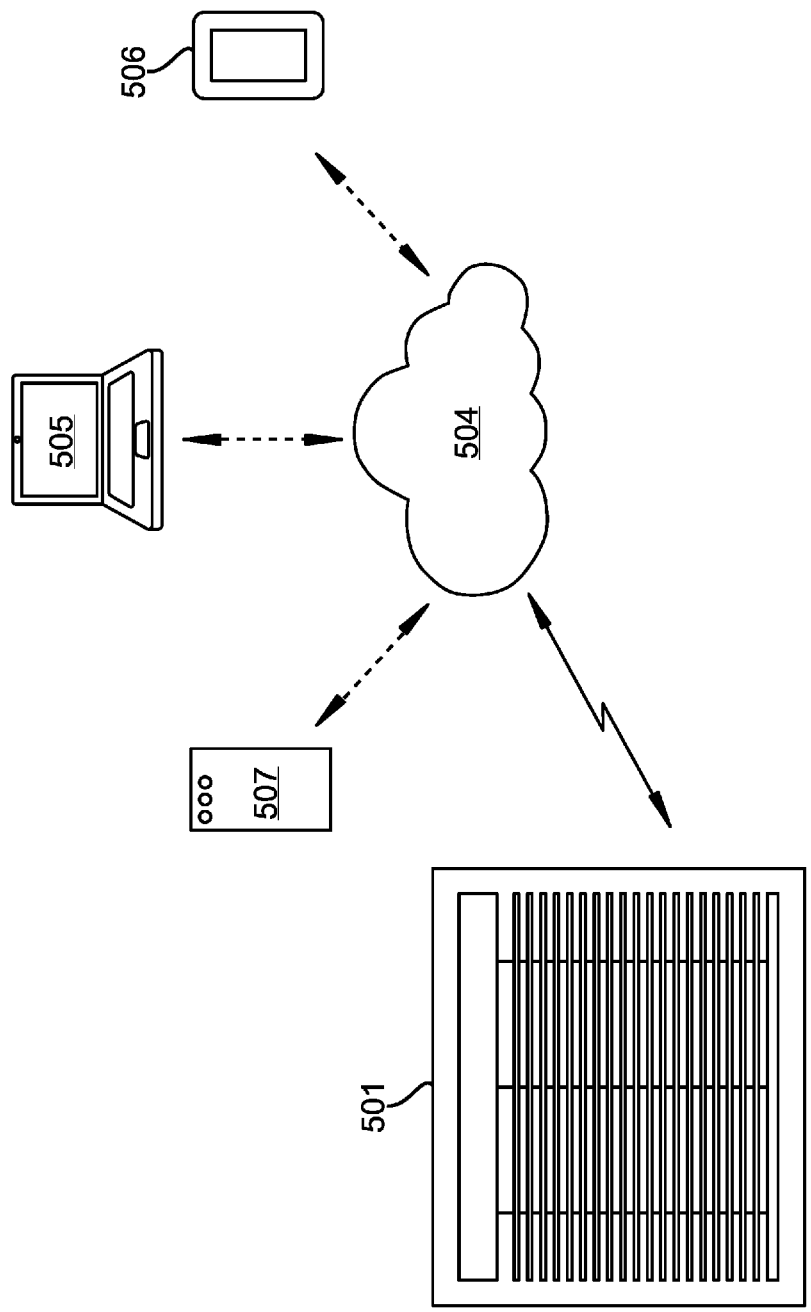

FIGS. 5A-C depict several example embodiments of control systems for a set of intelligent window blinds. FIG. 5A depicts intelligent window blinds 501, remote switch 502, control hub 503, cloud network 504, personal computer 505 (such as a laptop computer and/or a desktop computer), and user device 506 (such as a smartphone and/or a tablet). Blinds 501 include hardware processors and memory (not shown, but similar to that depicted above with regard to FIGS. 1 and 2) that store instructions for dynamically tilting blinds 501, as described above with regard to FIG. 1. Switch 502 allows for direct user control of blinds 501. For example, in some embodiments, the remote switch has a transceiver, a microcontroller, and one or more tactile control buttons. The microcontroller stores switch instructions that, when executed, override tilt instructions executed by blinds 501 and set blinds 501 to a static tilt state. Additionally, in some embodiments, the microcontroller stores instructions that undo the override instructions and set the window blinds to a dynamic tilt state controlled by intelligence stored on window blind hardware memory, such as is described above with regard to FIG. 1. In some embodiments, blinds 501 store the override and undo override instructions, and switch 502 signals execution of those instructions. Similarly, in other embodiments, control hub 502 stores the override and undo override instrustions. In such embodiments, switch 502 signals execution of those instructions, and control hub 502 sends control instructions to blinds 501 in accordance with the instructions. In similar embodiments, one of cloud network 504, personal computer 505, and/or user device 506 signal execution of the override and undo override instructions by control hub 503.

FIG. 5B depicts an embodiment where blinds 501 are independent of a local or cloud network, and are directly controllable by a user via switch 502. In the depicted embodiment, switch 502 is a transmit-only device. In such embodiments, the window blind hardware memory stores the override and undo override instructions, in addition to other dynamic and intelligent tilt instructions (such as is described above with regard to FIG. 1). Conversely, FIG. 5C depicts and embodiment where blinds 501 can only be manually controlled by a desktop computer 507, personal computer 505, user device 506, and/or other similar user devices, via cloud network 504.

Figure 6:
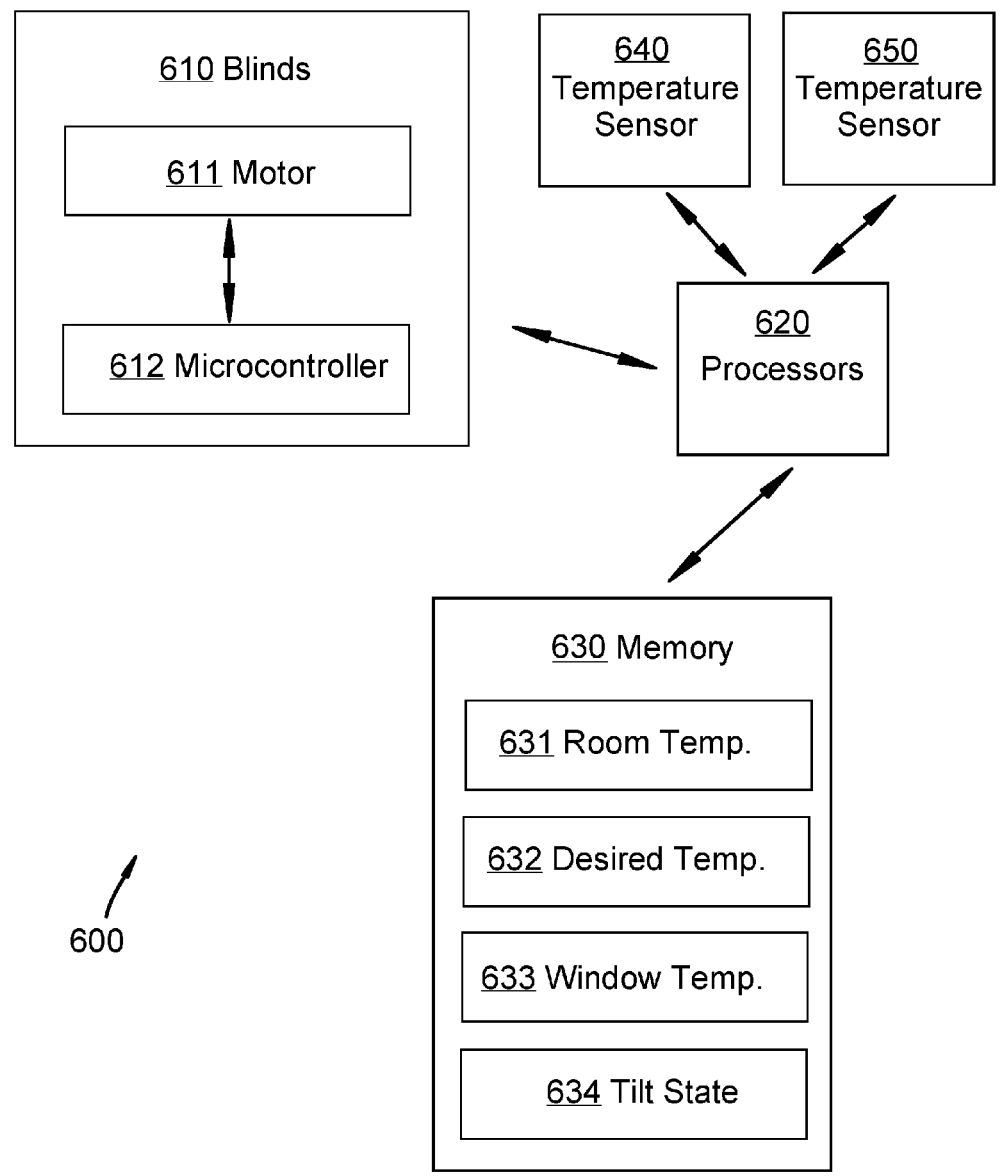
FIG. 6 depicts system diagram of an example intelligent window blind system.

FIG. 6 depicts system diagram of an example intelligent window blind system. System 600 includes window blinds 610, hardware processors 620, hardware memory 630, and temperature sensors 640, 650. Blinds 610 include motor 611, which is controlled by microcontroller 612. Microcontroller 612 stores dynamic tilt instructions for intelligently adjusting blinds 610 via motor 611. Temperature sensors 640, 650 measure a window-side and a room-side temperature, respectively, and communicate the temperatures to processors 620, which handle the data by performing coputations with it and/or sending it to memory 630 and/or microprocessor 612. Memory 630 stores data and instructions for determining an optimal tilt state of blinds, including room-side temperatures 631, desired temperatures 632, window-side temperatures 633, and tilt states 634 associated with the temperatures and zero-value room-side/desired temperature gradients.

In one example operation of system 600, temperature sensors 640, 650 measure the window-side and room-side temperatures and communicate those temperatures to processors 620. Processors 620 read a desired room temperature from memory 630 and calculate window-side/room-side temperature and room-side/desired temperature gradients. Based on the calculated gradients, processors 620 retrieve a tilted stated from memory 630 that will adjust room-side/desired temperature gradient to zero, and transmits the tilted state to microcontroller 612. Microcontroller 612 instructs motor 611 to adjust blinds 610 to the tilted state.

In another example operation of system 600, processors 620 calculate the gradients, but microcontroller 612 determines tilt states associated with zero-value room-side/desired temperature gradients. Processors 620 forwareds the gradients and tilted states associated with current temperatures to microcontroller 512, and microcontroller 512 calculates the tilted state associated with the current temperatures and the calculated gradients. In such an embodiment, referring to FIG. 1 and FIG. 6 jointly, microcontroller 612 determines the how %open should be varied, based on pre-calculated values for c and d, to give a zero-value room-side/desired temperature gradient for the current temperatures.

Figure 7:
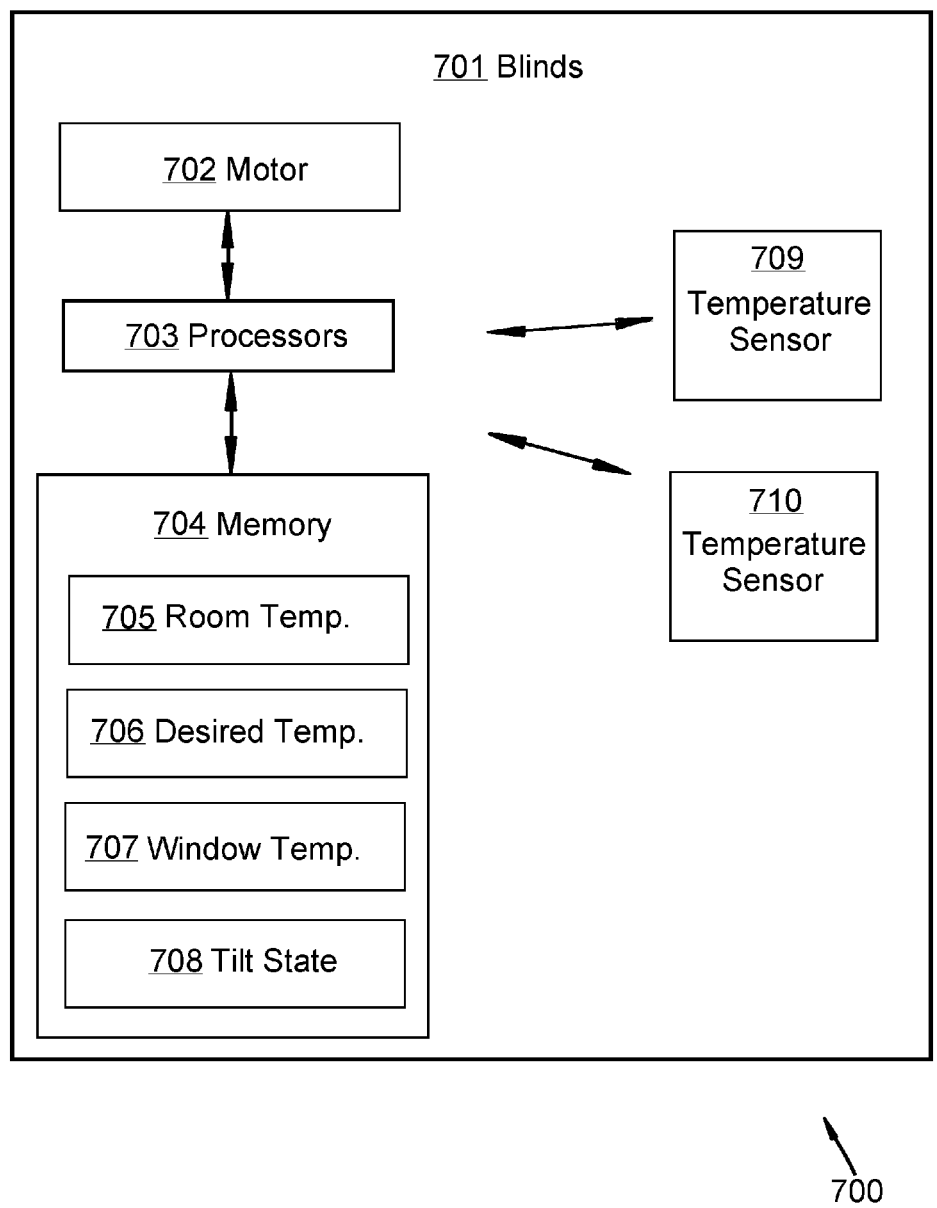
FIG. 7 depicts another system diagram of an example intelligent window blind system.

FIG. 7 depicts another system diagram of an example intelligent window blind system, similar to FIG. 6. System 700 includes blinds 701 and motor 702. However, different from system 600, processors 703, memory 704 (including room temperature data 705, desired room temperature data 706, window temperature data 707, and associated tilt states 708), and temperature sensors 709, 710 are incorporated into blinds 701. For example, in some embodiments, temperature sensors 709, 710 are monolithically incorporated into one or more window blind slats of blinds 701, such as by incorporating temperature sensors 709, 710 into a body of a window blind slat. In some other embodiments, temperature sensors 709, 710 are incorporated into a headrail of blinds 701. Processors 703 and memory 704 are in some embodiments, incorporated into blinds 701 as a microcontroller. In other embodiments, processors 703 and memory 704 are separate and more robust that a microcontroller. For example, in a specific embodiment, processors 703 are part of a CPU, memory 704 is non-volatile solid state memory, and processors 703 are networked to memory 704 via a printed circuit board.

Figure 8:
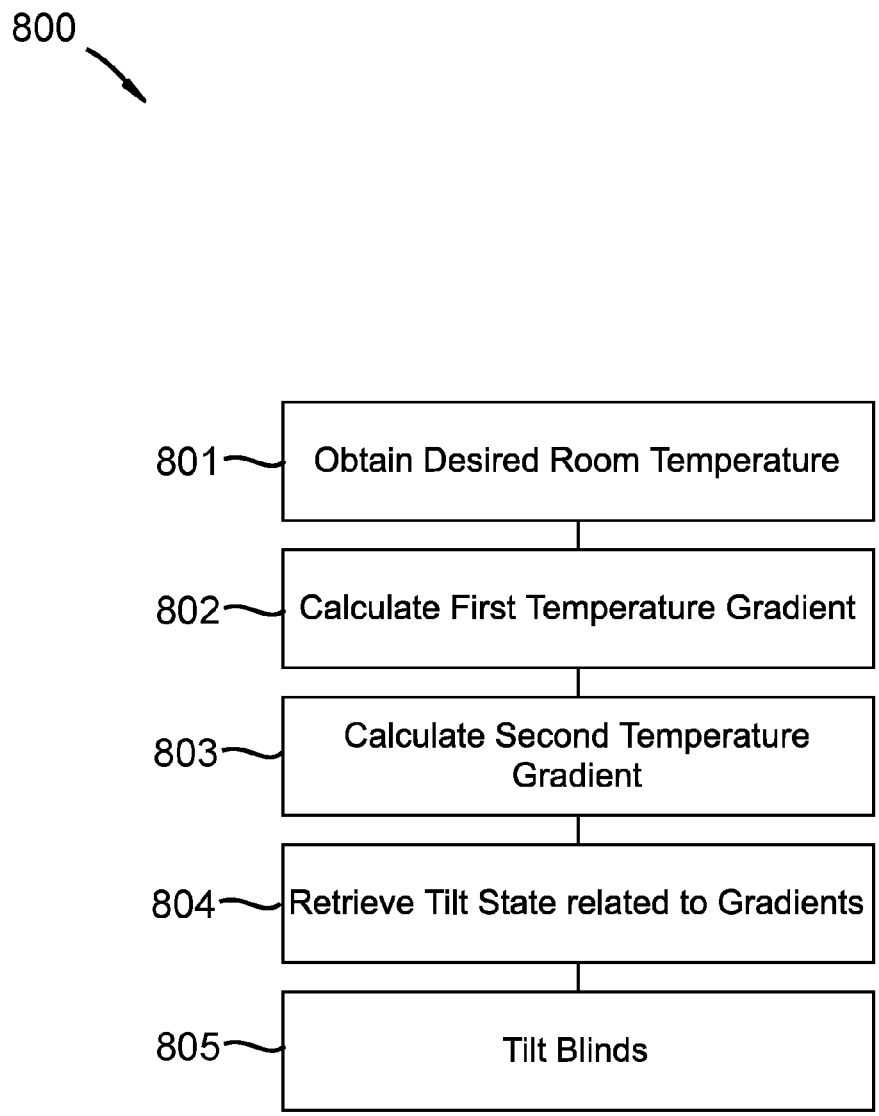
FIG. 8 depicts a method of intelligent dynamic window blind adjustment.

FIG. 8 depicts a method of intelligent dynamic window blind adjustment. Method 800 includes, at block 801, obtaining a desired room temperature based on a room temperature setting. For example, in one embodiment, the desired room temperature is obtained from a thermostat. At block 802, a first temperature gradient is calculated between a window side of a set of window blinds and a room side of the window blinds based on a window-side temperature and a room-side temperature. At block 803, a second temperature gradient is calculated between the room-side temperature and the desired room temperature. At block 804, a tilted stated is retrieved. The tilted state is related the first temperature gradient, the desired room temperature, and a zero-value second temperature gradient. At block 805, the window blinds are tilted to the tilted state.

Figure 9:
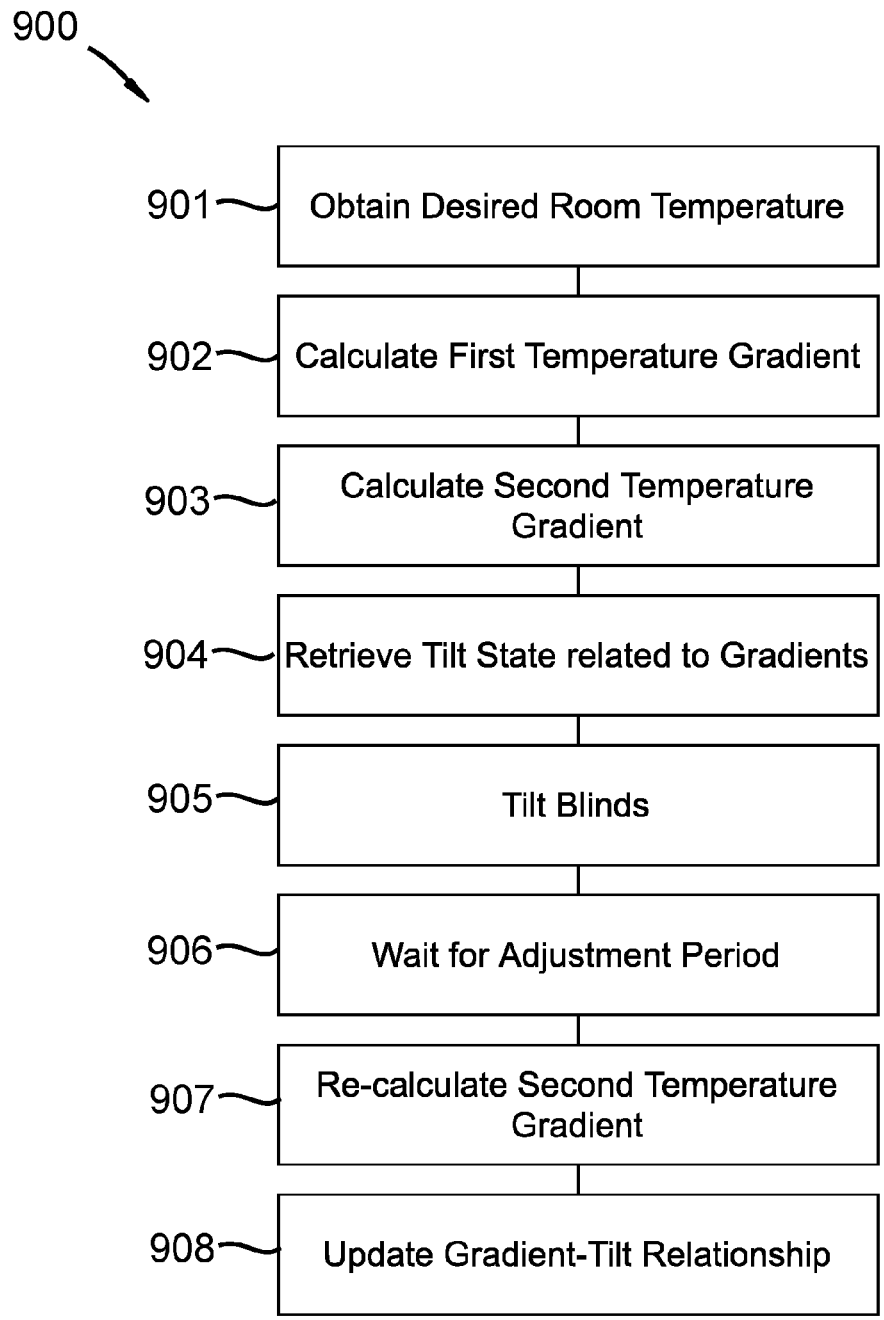
FIG. 9 depicts a method for training an intelligent dynamic window blind system.

FIG. 9 depicts a method for training an intelligent dynamic window blind system. Method 900 includes the blocks of method 800 (shown as blocks 901-905, and described above). Additionally, method 900 includes, at block 906, waiting for a second temperature gradient adjustment period. The second temperature gradient adjustment period is a period of time long enough for the second temperature gradient to adjust after the window blinds are tilted. At block 907, the second temperature gradient is re-calculated. At block 908, the relationship between the tilted state, the first temperature gradient, the desired room temperature, and the second temperature gradient is updated with the re-calculated second temperature gradient. For example, if a set of values for the tilted state, the first temperature gradient, and the desired room temperature is initially associated with a zero-value second temperature gradient, but after waiting for an adjustment period, are determined to be associated with a non-zero second temperature gradient, the relationship is updated, and the system predicts a tilted state for the current temperatures that will result in a zero-value second temperature gradient.

Figure 10:
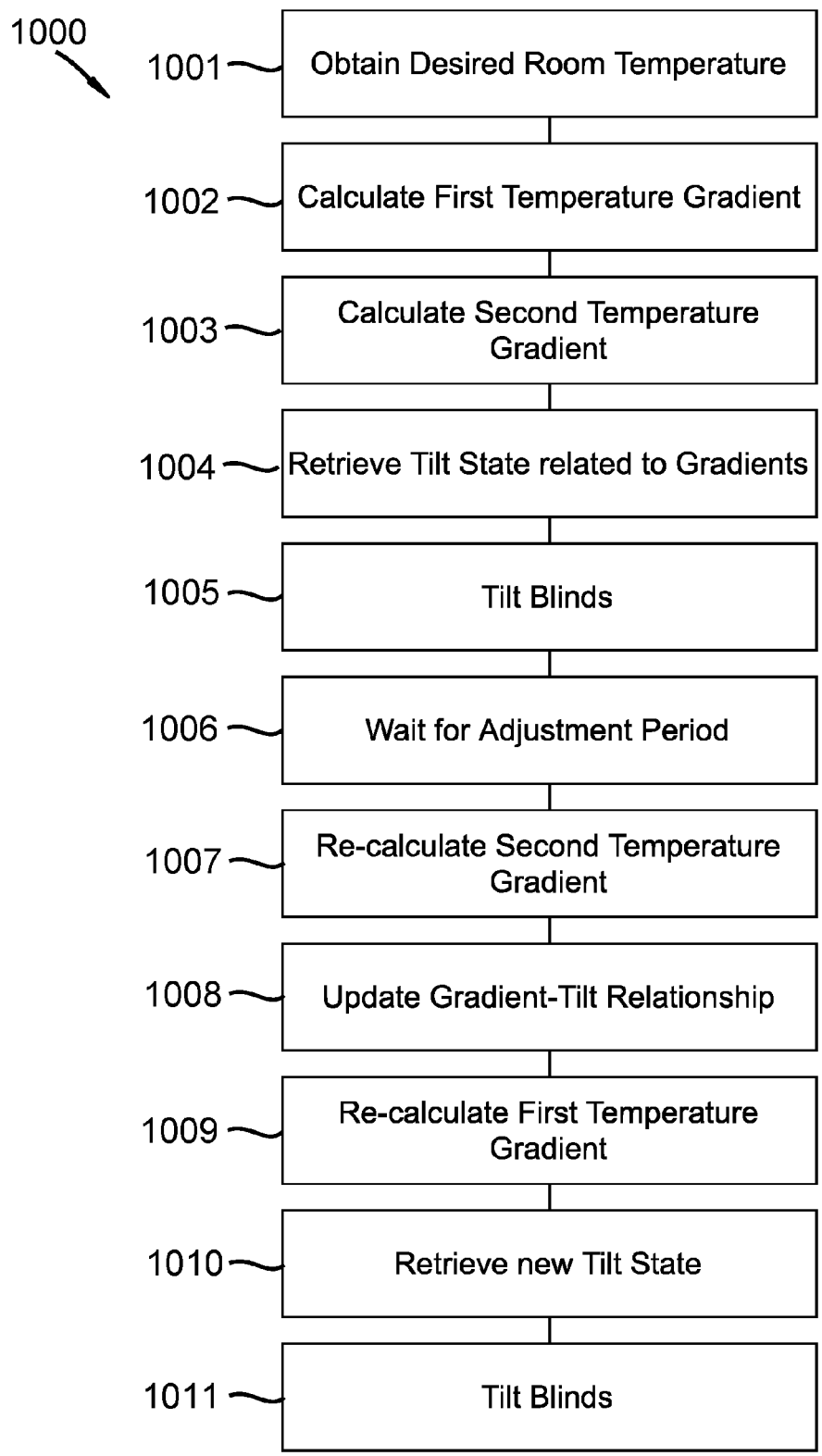
FIG. 10 depicts a method for intelligently adjusting a window blind system based on newly obtained training data.

FIG. 10 depicts a method for intelligently adjusting a window blind system based on newly obtained training data. Method 1000 inlcudes the blocks of method 900 (shown as blocks 1001-1008, and described above). Additionally, method 1000 includes, at block 1009, re-calculating the first temperature gradient. At block 1010, a new tilted state is retrieved related to the re-calculated first temperature gradient, the desired room temperature, and the zero-value second temperature gradient. At block 1011, the window blinds are tilted to the new tilted state.

Figure 11:
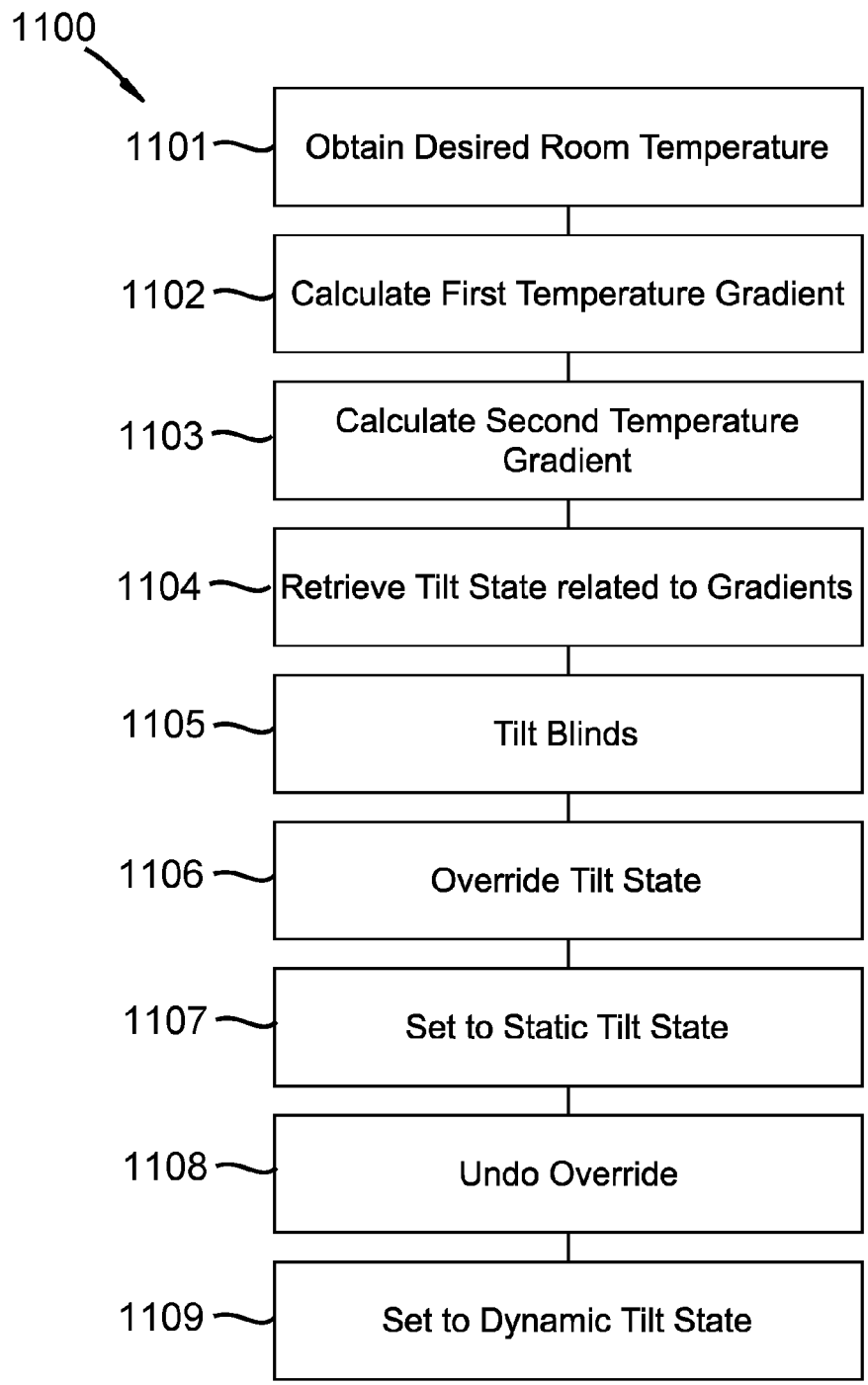
FIG. 11 depicts a method for overriding and undoing an override of an intelligent dynamic window blind system.

FIG. 11 depicts a method for overriding and undoing an override of an intelligent dynamic window blind system. Method 1100 inlcudes the blocks of method 800 (shown as blocks 1101-1105, and described above). Additionally, method 1100 includes, at block 1106, overriding the tilt instruction. At block 1107, the window blinds are set to a static tilt state. At block 1108, the override instructions are undone. At block 1108, the window blinds are reset to a dynamic tilt state, wherein the window blinds intelligently adjust to maintain a zero-value second temperature gradient.

Figure 12:
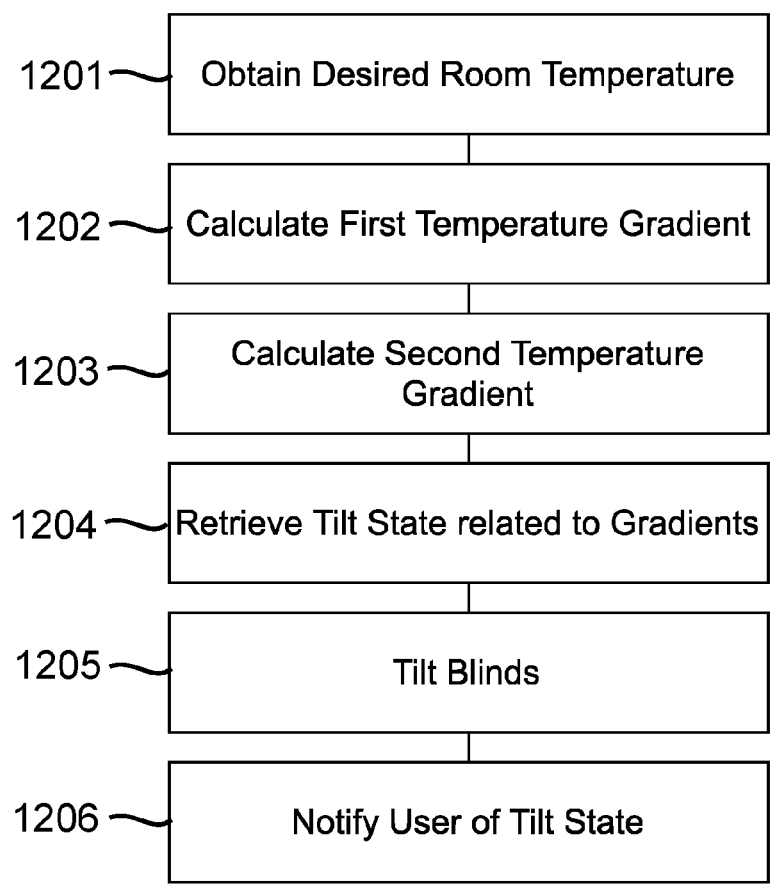
FIG. 12 depicts a method for notifying a user of the tilt state in an intelligent dynamic window blind system.

FIG. 12 depicts a method for notifying a user of the tilt state in an intelligent dynamic window blind system. Method 1200 includes the blocks of method 800 (shown as blocks 1201-1205, and described above). Additionally, method 1200 inlcudes, at block 1206, notifying a user of the tilt state.

We claim:

1. A system comprising:
   a set of window blind slats;
   a motor that tilts the set of window blind slats;
   a first temperature sensor that is coupled to a first slat in the set of window blind slats and positioned at a window-side of the set of window blind slats;
   a second temperature sensor that is coupled to a second slat in the set of window blind slats and positioned at a room-side of the set of window blind slats;
   one or more hardware processors; and
   hardware memory storing dynamic tilt instructions that, when executed by the one or more hardware processors, instruct the motor to dynamically tilt the set of window blind slats, wherein the instructions comprise:
   obtaining a desired room temperature, a window-side temperature from the first temperature sensor, and a room-side temperature from the second temperature sensor;
   calculating a first temperature gradient between the window-side temperature and the room-side temperature;
   calculating a second temperature gradient between the room-side temperature and the desired room temperature;
   retrieving a tilted state related to the first temperature gradient, the desired room temperature, and a zero-value second temperature gradient; and
   tilting the set of window blind slats to the tilted state.

2. The system of claim 1, further comprising a thermostat that communicates the desired room temperature to the hardware processors.

3. The system of claim 2, further comprising a system wireless transceiver, wherein the thermostat communicates the desired room temperature to the hardware processors via a thermostat wireless transceiver.

4. The system of claim 1, further comprising a system transceiver, wherein a user device communicates the desired room temperature to the hardware processors.

5. The system of claim 4, wherein the transceiver is one of a hardwire transceiver or a wireless transceiver.

6. The system of claim 5, wherein the user device is one or more of a personal computer, a laptop computer, a smartphone, or a tablet.

7. The system of claim 6, further comprising a remote switch having a transceiver, a microcontroller, and one or more tactile control buttons, wherein the microcontroller stores switch instructions that, when executed:
   override the tilt instruction and set the set of window blind slats to a static tilt state; and
   undo the override instruction and set the set of window blind slats to a dynamic tilt state.

8. The system of claim 1, wherein the dynamic tilt instructions further comprise:
   waiting for a period during which the second temperature gradient adjusts;
   re-calculating the second temperature gradient; and
   updating the relationship between the tilted state, the first temperature gradient, the desired room temperature, and the second temperature gradient with the re-calculated second temperature gradient.

9. The system of claim 8, wherein the dynamic tilt instructions further comprise:
   re-calculating the first temperature gradient;
   retrieving a new tilted state related to the re-calculated first temperature gradient, the desired room temperature, and the zero-value second temperature gradient; and
   tilting the set of window slats to the new tilted state.

10. A method comprising:
    obtaining a desired room temperature based on a room temperature setting;
    calculating a first temperature gradient between a first temperature sensor that is coupled to a first slat in a set of window blind slats and positioned at a window side of the set of window blind slats and a second temperature sensor that is coupled to a second slat in the set of window blind slats and positioned at a room side of the set of window blind slats based on a window-side temperature from the first temperature sensor and a room-side temperature from the second temperature sensor;
    calculating a second temperature gradient between the room-side temperature and the desired room temperature;
    retrieving a tilted state related to the first temperature gradient, the desired room temperature, and a zero-value second temperature gradient;
    tilting the set of window blind slats to the tilted state.

11. The method of claim 10, further comprising:
    waiting for a period during which the second temperature gradient adjusts;
    re-calculating the second temperature gradient; and
    updating the relationship between the tilted state, the first temperature gradient, the desired room temperature, and the second temperature gradient with the re-calculated second temperature gradient.

12. The method of claim 11, further comprising:
    re-calculating the first temperature gradient;
    retrieving a new tilted state related to the re-calculated first temperature gradient, the desired room temperature, and the zero-value second temperature gradient; and
    tilting the set of window blind slats to the new tilted state.

13. The system of claim 10, further comprising overriding the tilt instruction and setting the set of window blind slats to a static tilt state.

14. The system of claim 10, further comprising undoing the override instruction and setting the set of window blind slats to a dynamic tilt state.

15. The system of claim 10, notifying a user of the tilt state.

16. An apparatus comprising:
a motor having a window blind coupler that couples a window blind tilt rod to the motor;
a microcontroller storing instructions that, when executed, instruct the motor to dynamically actuate the window blind coupler, wherein the instructions comprise:
obtaining a desired room temperature, a first temperature from a first temperature sensor that is coupled to a first slat in a set of window blind slats and positioned at a window-side of the set of window blind slats, and a second temperature from a second temperature sensor that is coupled to a second slat in the set of window blind slats and positioned at a room-side of the set of window blind slats;
calculating a first temperature gradient between the first temperature and the second temperature;
calculating a second temperature gradient between the second temperature and the desired room temperature;
retrieving a tilted state related to the first temperature gradient, the desired room temperature, and a zero-value second temperature gradient; and
activating the motor to turn the window blind coupler to tilt the set of window blind slats to the tilted state.

17. The apparatus of claim 16, wherein the instructions further comprise:
waiting for a period during which the second temperature gradient adjusts;
re-calculating the second temperature gradient; and
updating the relationship between the tilted state, the first temperature gradient, the desired room temperature, and the second temperature gradient with the re-calculated second temperature gradient.

18. The apparatus of claim 17, wherein the instructions further comprise:
re-calculating the first temperature gradient;
retrieving a new tilted state related to the re-calculated first temperature gradient, the desired room temperature, and the zero-value second temperature gradient; and
tilting the set of window blind slats to the new tilted state.

19. The apparatus of claim 16, wherein the instructions further comprise:
overriding the tilt instruction and setting the set of window blind slats to a static tilt state; and
undoing the override instruction and setting the set of window blind slats to a dynamic tilt state.

20. The apparatus of claim 16, wherein the apparatus further comprises a wireless transceiver, and wherein the instructions further comprise notifying a user of the tilt state.

* * * * *